United States Patent
Sivan et al.

(10) Patent No.: US 10,444,259 B2
(45) Date of Patent: Oct. 15, 2019

(54) AUTOMATIC CALIBRATION AND TUNING OF FEEDBACK SYSTEMS

(71) Applicant: TECHNION RESEARCH & DEVELOPMENT FOUNDATION LIMITED, Haifa (IL)

(72) Inventors: Uri Sivan, Haifa (IL); Kfir Kuchuk, Rishon le'Ziyon (IL); Itai Schlesinger, Haifa (IL)

(73) Assignee: TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 0 days.

(21) Appl. No.: 15/755,144

(22) PCT Filed: Aug. 24, 2016

(86) PCT No.: PCT/IL2016/050920
§ 371 (c)(1),
(2) Date: Feb. 26, 2018

(87) PCT Pub. No.: WO2017/033187
PCT Pub. Date: Mar. 2, 2017

(65) Prior Publication Data
US 2018/0217180 A1 Aug. 2, 2018

Related U.S. Application Data

(60) Provisional application No. 62/209,982, filed on Aug. 26, 2015.

(51) Int. Cl.
*G01Q 10/06* (2010.01)
*G01Q 40/00* (2010.01)
(Continued)

(52) U.S. Cl.
CPC .......... *G01Q 10/065* (2013.01); *G01Q 40/00* (2013.01); *G01Q 40/02* (2013.01); *G01Q 60/32* (2013.01)

(58) Field of Classification Search
CPC ...... G01Q 10/00; G01Q 10/04; G01Q 10/045; G01Q 10/06; G01Q 10/065; G01Q 40/00;
(Continued)

(56) References Cited

U.S. PATENT DOCUMENTS

| 7,066,014 B2 | 6/2006 | Salapaka et al. |
| 2009/0062935 A1* | 3/2009 | Abramovitch ......... B82Y 35/00 700/42 |

(Continued)

OTHER PUBLICATIONS

International Search Report of PCT/IL2016/050920 completed Nov. 30, 2016; dated Dec. 4, 2016 3 pages.
(Continued)

*Primary Examiner* — David E Smith
(74) *Attorney, Agent, or Firm* — The Roy Gross Law Firm, LLC; Roy Gross

(57) ABSTRACT

A method for automatically calibrating a feedback system, comprising: receiving one or more input parameters associated with a feedback system; applying the one or more input parameters to a model of the feedback system; deriving one or more feedback parameters for the feedback system from the model by: optimizing the model for the feedback parameters, and applying a noise characteristic of the feedback system to the model; and automatically tuning the feedback system using the one or more derived feedback parameters.

9 Claims, 7 Drawing Sheets

(51) Int. Cl.
*G01Q 60/32* (2010.01)
*G01Q 40/02* (2010.01)

(58) Field of Classification Search
CPC ........ G01Q 40/02; G01Q 60/00; G01Q 60/32; G01Q 60/24
See application file for complete search history.

(56) References Cited

U.S. PATENT DOCUMENTS

| | | | |
|---|---|---|---|
| 2010/0024082 A1* | 1/2010 | Ando | G01Q 60/32 850/33 |
| 2014/0150139 A1* | 5/2014 | Moon | G01Q 60/32 850/5 |
| 2015/0020245 A1* | 1/2015 | Labuda | G01Q 30/06 850/33 |
| 2015/0309071 A1* | 10/2015 | Proksch | G01Q 60/32 850/1 |

OTHER PUBLICATIONS

Witten Opinion of PCT/IL2016/050920 completed Nov. 30, 2016; dated Dec. 4, 2016 4 pages.

* cited by examiner

AUTOMATIC CALIBRATION AND TUNING OF FEEDBACK SYSTEMS

CROSS-REFERENCE TO RELATED APPLICATIONS

This application is a National Phase of PCT Patent Application No. PCT/IL2016/050920 having International filing date of Aug. 24, 2016, which claims the benefit of priority to U.S. Provisional Patent Application No. 62/209,982 filed Aug. 26, 2015, entitled "Automatic Calibration and Tuning of Feedback Systems". The contents of the above applications are all incorporated by reference as if fully set forth herein in their entirety.

BACKGROUND

The invention relates to the field of feedback systems.

Feedback systems commonly use controllers to minimize the error signal resulting from the difference between a measured output of the system and a desired set point. The controllers process the error and adjust and/or manipulate one or more of the control signals that affect the output to reduce the error. This process is usually regulated by a set of feedback/control parameters. Proportional-integral-derivative (PID) controllers are regulated by three such parameters: P corresponds to the currently measured error, I corresponds to accumulated past error, and D corresponds to the rate of change of current error.

Proportional-integral (PI) controllers operate similarly to PID controllers, with the notable difference that the derivative, or predictive parameter is set to zero.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for automatically calibrating a feedback system, the method comprising: receiving one or more input parameters associated with a feedback system; applying the one or more input parameters to a model of the feedback system; deriving one or more feedback parameters for the feedback system from the model by: optimizing the model for the feedback parameters, and applying a noise characteristic of the feedback system to the model; and automatically tuning the feedback system using the one or more derived feedback parameters.

In some embodiments, the feedback system is a frequency modulated atomic force microscopy (FM-AFM) system comprising a cantilever tip configured to oscillate over a sample supported on a piezo stage, wherein the cantilever tip is controlled by a frequency feedback loop that is coupled to a z-piezo feedback loop that controls the piezo stage.

In some embodiments, applying the noise characteristic comprises leveraging a correlation between the noise characteristic to a characteristic of the model.

In some embodiments, leveraging the correlation comprises adjusting the noise characteristic to fit the characteristic of the model.

In some embodiments, the noise characteristic is adjusted by varying one of the feedback parameters, and wherein the characteristic of the model comprises a frequency response of the feedback system.

In some embodiments, the model of the feedback system includes two coupled feedback parameters, and wherein deriving the feedback parameters comprises decoupling the coupled feedback parameters by adjusting the noise characteristic to fit the characteristic of the model.

There is provided, in accordance with an embodiment, a computer program product comprising a non-transitory computer-readable storage medium having program code embodied thereon, the program code executable by at least one hardware processor to: receive one or more input parameters associated with a feedback system; apply the one or more input parameters to a model of the feedback system; derive one or more feedback parameters for the feedback system from the model by: optimize the model for the feedback parameters, and apply a noise characteristic of the feedback system to the model; and automatically tune the feedback system using the one or more derived feedback parameters.

In some embodiments, the feedback system is a frequency modulated atomic force microscopy (FM-AFM) system comprising a cantilever tip configured to oscillate over a sample supported on a piezo stage, wherein the cantilever tip is controlled by a frequency feedback loop that is coupled to a z-piezo feedback loop that controls the piezo stage.

In some embodiments, applying the noise characteristic comprises leveraging a correlation between the noise characteristic to a characteristic of the model.

In some embodiments, leveraging the correlation comprises adjusting the noise characteristic to fit the characteristic of the model.

In some embodiments, the noise characteristic is adjusted by varying one of the feedback parameters, and wherein the characteristic of the model comprises a frequency response of the feedback system.

In some embodiments, the model of the feedback system includes two coupled feedback parameters, and wherein deriving the feedback parameters comprises decoupling the coupled feedback parameters by adjusting the noise characteristic to fit the characteristic of the model.

There is provided, in accordance with an embodiment, a system for tuning a feedback system, comprising: a feedback system; and a tuner, wherein the tuner is configured to: receive one or more input parameters associated with a feedback system; apply the one or more input parameters to a model of the feedback system; derive one or more feedback parameters for the feedback system from the model by: optimize the model for the feedback parameters, and apply a noise characteristic of the feedback system to the model; and automatically tune the feedback system using the one or more derived feedback parameters.

In some embodiments, the feedback system is a frequency modulated atomic force microscopy (FM-AFM) system comprising a cantilever tip configured to oscillate over a sample supported on a piezo stage, wherein the cantilever tip is controlled by a frequency feedback loop that is coupled to a z-piezo feedback loop that controls the piezo stage.

In some embodiments, applying the noise characteristic comprises leveraging a correlation between the noise characteristic to a characteristic of the model.

In some embodiments, leveraging the correlation comprises adjusting the noise characteristic to fit the characteristic of the model.

In some embodiments, the noise characteristic is adjusted by varying one of the feedback parameters, and wherein the characteristic of the model comprises a frequency response of the feedback system.

In some embodiments, the model of the feedback system includes two coupled feedback parameters, and wherein deriving the feedback parameters comprises decoupling the coupled feedback parameters by adjusting the noise characteristic to fit the characteristic of the model.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

A system and method are disclosed herein to automatically calibrate a feedback system using a linearized model. Although a linearized model of a coupled feedback system is presented, the system and method may be equally applied to non-coupled feedback systems. The linearized model is optimized to derive parameters for tuning the system. Additionally, a noise characteristic of the system may be used to derive the optimal feedback parameters from the model. In one implementation, the noise characteristic is used to decouple any derived feedback parameters that remain coupled after the optimization. Thus derived, the parameters may be applied to tune and/or calibrate one or more controllers of the system.

Figure 1:
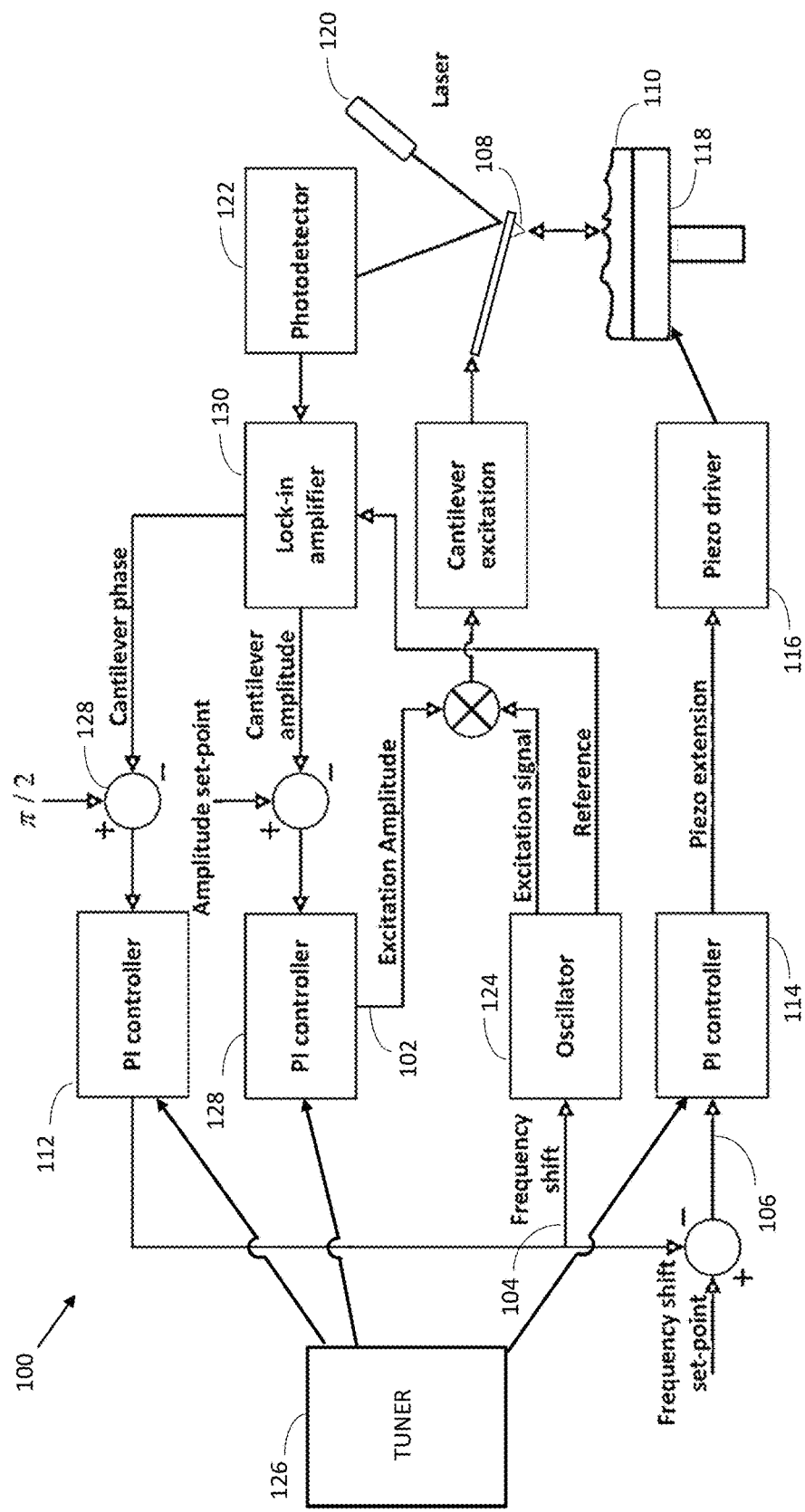
FIG. 1 illustrates a simplified conceptual illustration of a feedback system, in accordance with an embodiment.

Reference is now made to FIG. 1 which illustrates a simplified conceptual illustration of an Atomic Force Microscopy (AFM) system 100, in accordance with an embodiment. Although the system and method described below is applied to tuning and/or calibrating a frequency-modulated Atomic Force Microscopy (FM-AFM) feedback system, this is merely an exemplary implementation, and the method may be applied with respect to any feedback system. It may further be noted that system 100 illustrates a common configuration for an FM-AFM system, however this is not meant to be limiting, and the invention may apply to any configuration of a feedback system, and specifically any configuration of an AFM feedback system.

AFM has been established as one of the most powerful imaging techniques available due to its versatility and resolution. Among common modes of AFM, FM-AFM is emerging as the mode of choice for high resolution imaging in vacuum, air, and liquid. To achieve that, it utilizes three feedback loops to control the cantilever excitation amplitude, cantilever driving frequency, and z-piezo extension.

The feedback loops are commonly implemented with one PI controller per loop, each regulated by two parameters, a proportional gain and a time constant. Additionally, the lock-in amplifier is equipped with a low-pass filter (LPF) of selectable order and cutoff frequency. It is necessary to tune these parameters to obtain stability, high sensitivity, and low noise in the imaging process. The amplitude loop, being weakly coupled to the other loops, may be tuned independently of them by optimization of its two PI parameters. However, tuning of the remaining two feedback loops is generally difficult due to their non-linear coupling. It requires simultaneous optimization of two LPF parameters and four PI parameters, while taking into account the unknown tip-sample interaction. A few methods have been devised for obtaining frequency and piezo loop parameters. While these methods do provide first-guess working parameters, they seem to be insufficient for high performance applications such as atomic resolution imaging in liquid. Optimization of FM-AFM parameters is therefore still done manually by a tedious, time consuming process of trial and error, and by relying on the experience of expert users.

Exemplary system 100 includes three feedback loops: an amplitude feedback loop 102, and a frequency feedback loop 104 coupled to a z-piezo feedback loop 106. Amplitude feedback loop 102 maintains a set-point oscillation amplitude for a cantilever 108 that oscillates above a sample 110. Frequency feedback loop 104 maintains a $\pi/2$ phase difference between a cantilever excitation force applied to a cantilever 108 and the oscillation of cantilever 108. This phase difference causes cantilever 108 to oscillate at a resonance frequency that varies with the cantilever tip-sample interaction and separation. A frequency controller 112 sends the frequency shift to an oscillator 124 which produces the sinusoidal excitation subsequently applied to cantilever 108. Oscillator 124 additionally creates a reference signal for a lock-in amplifier 130, which is necessary to detect the cantilever displacement signal coming from a photodetector 122. Z-piezo feedback loop 106, coupled to frequency feedback loop 104, compares the frequency shift signal from frequency feedback loop 104 with a set-point frequency shift to generate a piezo extension signal from z-piezo controller 114. Z-piezo controller 114 provides the piezo extension signal to a piezo driver 116 that moves a stage 118 supporting sample 110, and thus modifies the distance between the tip of cantilever 108 and sample 110 to meet the set-point frequency shift. Cantilever 108 thus tracks planes of equal frequency shift as it scans the sample surface 110, and the surface topography of sample 110 is obtained by recording the piezo extension signal as a function of the position of piezo stage 118 in the x-y plane. A laser 120 illuminates cantilever tip 108 and the cantilever oscillation signal is obtained via a photodetector 122.

Feedback loops 102, 104, and 106 are generally regulated by eight user controlled parameters. Most commonly, these loops are implemented with one proportional-integral (PI) controller per loop, each regulated by two parameters, a proportional gain and a time constant. Additionally, lock-in amplifier 130 is provided with a low-pass filter (LPF) of selectable order and cutoff frequency. It is necessary to tune these parameters to obtain stability, high sensitivity and low noise in the imaging process. The amplitude loop 102, which is weakly coupled to the other loops, may be tuned independently of loops 104 and 106 by a relatively straightforward optimization of its two PI parameters. However, tuning of the remaining two feedback loops, 104 and 106, is generally difficult due to their non-linear coupling, and requires simultaneous optimization of two LPF parameters and four PI parameters, while taking into account the initially unknown tip-sample interaction. Thus, an algorithm for automated optimization of the two coupled feedback loop parameters is presented herein. The algorithm utilizes the z-piezo noise to determine the unknown tip-sample transfer function.

A tuner 126 may be provided to receive one or more values corresponding to system 100, such as a quality-factor for cantilever 108, Q, and a cantilever reference resonance frequency $f_0^{ref}$. For example, Q and $f_0^{ref}$ may be measured in an initialization step, such as by performing a frequency sweep prior to scanning sample 108.

Tuner 126 is configured to apply the values to calculate one or more control parameters that optimize the overall bandwidth and step response of system 100, and provide the calculated control parameters to system 100 to allow reliable imaging of the surface of sample 110. For example, tuner 126 may calculate gain and time constant parameters for one or more proportional-integral (PI) controllers provided with system 100, such as an amplitude PI controller 128, frequency controller 112, and z-piezo controller 114, and provide these calculated parameters to any of controllers 112, 114, and 128 to tune system 100, accordingly.

Optionally, tuner 126 may compute one or more control parameters to tune lock-in amplifier 130, and provide the control parameters to lock-in amplifier 130, accordingly.

Amplitude feedback loop 102 may be loosely coupled to frequency feedback loop 104 and z-piezo feedback loop 106, and thus, tuner 126 may determine any feedback parameters required by amplitude PI controller 128 independently of feedback loops 104 and 106.

Feedback loops 104 and 106 may be strongly coupled, and thus, the feedback parameters required to tune frequency PI controller 112 and/or z-piezo PI controller 114 may be determined using a linearized model for system 100 as follows.

Figure 2:
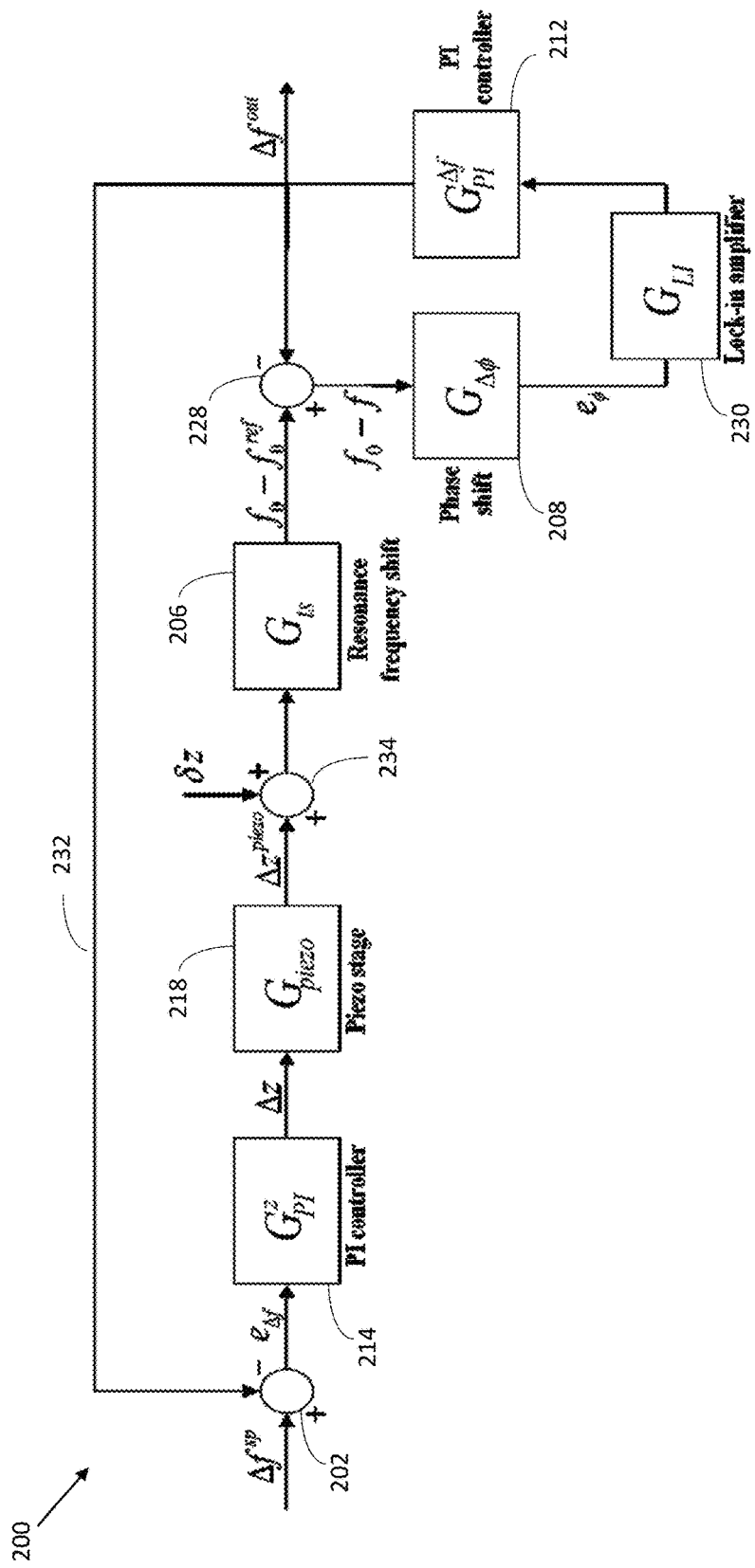
FIG. 2 shows an exemplary linearized model of a feedback system of FIG. 1, in accordance with an embodiment.

Reference is now made to FIG. 2 which illustrates an exemplary linearized model 200 of the FM-AFM system of FIG. 1, in accordance with an embodiment. As discussed above with respect to FIG. 1, the model of FIG. 2 is but one exemplary implementation for solving but one exemplary feedback system, and other suitable models may equally apply for the system of FIG. 1, or for other feedback systems. For example, fewer or additional blocks and/or feedback loops may be used, the mathematical formulation of which may be modified accordingly.

An output frequency shift $\Delta f^{out}=f-f_0^{ref}$ of controller 112 of FIG. 1 is fed into an adder 202, where f is the cantilever driving frequency and $f_0^{ref}$ is the reference resonance frequency. Adder 202 subtracts the output frequency shift from a desired, or set point frequency shift, $\Delta f^{sp}$, resulting in an error signal $e_{\Delta f}$ that is fed into z-piezo PI controller block 214, corresponding to z-piezo controller 114, the transfer function of which may be modelled as:

$$G_{PI}^z(s) = p^z\left(1 + \frac{1}{sT^z}\right) \quad (1)$$

where $p^z$ is the proportional gain and $T^z$ is the time constant corresponding to PI controller 114, and s represents the frequency in the complex plane. PI controller 114 drives piezo stage 118 via piezo driver 116 to a relative displacement of $\Delta z=z-z^{ref}$, where $f_0(z^{ref})=f_0^{ref}$ and $f_0(z)$ is the resonance frequency of cantilever 108 at a given tip-sample separation. This is modeled in FIG. 2 as PI controller 214 sending a control signal to piezo stage 218, corresponding to piezo stage 118, via the piezo driver. Thus, the resulting relative piezo extension may be expressed as:

$$\Delta z^{piezo} = G_{piezo}(s)\Delta z \quad (2)$$

where $G_{piezo}$ is the transfer function of piezo stage 118, and may be measured by touching the sample surface with cantilever 108, modulating $\Delta z$ and measuring the response in the deflection signal. Typically, $G_{piezo}$ is approximately a LPF.

The change in $f_0$ resulting from a small change in tip-sample separation may be approximated by:

$$f_0 - f_0^{ref} = f_0'(z_{ref})\Delta z^{piezo} \quad (3).$$

The tip-sample transfer function may thus be formulated as:

$$G_{ts}(s) = f_0'(z_{ref}) \quad (4).$$

The signal $f_0 - f_0^{ref}$ is subsequently compared with the output frequency shift, $\Delta f^{out}$, resulting in the frequency shift from the true cantilever resonance, $$f_0 - f_0^{ref} - (f - f_0^{ref}) = f_0 - f \quad (5).$$

This signal determines the cantilever phase shift. Within the damped harmonic oscillator model the cantilever phase is given by $$\phi_c = \tan^{-1}\left(\frac{ff_0}{Q(f_0^2 - f^2)}\right). \quad (6)$$

Assuming a small shift from resonance:

$$f \approx f_0,$$

$$f_0^{ref} \gg |f_0'(z_{ref})\Delta z|,$$

enables the phase error, $e_\phi = \phi_c - \pi/2$, to be expressed as $$e_\phi \approx \frac{2Q}{f_0}(f_0 - f)$$

$$\approx \frac{2Q}{f_0^{ref}}(f_0 - f)$$

Thus, the phase shift transfer function may be expressed by a constant:

$$G_{\Delta\phi}(s) = \frac{2Q}{f_0^{ref}}. \quad (7)$$

The phase error $e_\phi$, is then detected by lock-in amplifier 130, represented by block 230, which may comprise an n'th order LPF described by $$G_{LI}(s) = \frac{1}{(1+\tau s)^n}, \quad (8)$$

where $\tau$ is the lock-in time constant.

The detected phase enters the second PI controller block 212, corresponding to frequency PI controller 112, the transfer function of which is $$G_{PI}^{\Delta f}(s) = p^{\Delta f}\left(1 + \frac{1}{sT^{\Delta f}}\right), \quad (9)$$

where $p^{\Delta f}$ is the proportional gain and $T^{\Delta f}$ is the time constant of the controller. The controller output, $\Delta f^{out}$, drives an oscillator 124, shown in FIG. 1, to generate the cantilever excitation signal. The control loop is closed by feeding the same signal to adder 228, corresponding to adder 128 of FIG. 1.

The total feedback loop transfer function may be calculated according to the model illustrated in FIG. 2. Blocks $G_{\Delta\phi}$ 208, $G_{LI}$ 224 and $G_{PI}^{\Delta f}$ 212 make up a nested loop, the total transfer function of which is $$G_{\Delta f}(s) = \frac{G_{\Delta\phi}G_{LI}G_{PI}^{\Delta f}}{1 + G_{\Delta\phi}G_{LI}G_{PI}^{\Delta f}}. \quad (10)$$

Using this result, $\Delta z^{piezo}$ may be given by $$\Delta z^{piezo}(s) = \delta z G_{\delta z} + \Delta f^{sp} G_{sp} \quad (11),$$

where $$G_{\delta z}(s) = \frac{G_{ts}G_{\Delta f}G_{PI}^{z}G_{piezo}}{1 + G_{ts}G_{\Delta f}G_{PI}^{z}G_{piezo}}, \quad (12)$$

and $$G_{sp}(s) = \frac{G_{PI}^{z}G_{piezo}}{1 + G_{ts}G_{\Delta f}G_{PI}^{z}G_{piezo}}. \quad (13)$$

In the FM-AFM system of FIG. 1, the surface topography of sample 108 is imaged by scanning its surface in the x-y plane via stage 118 and recording the detected displacement signal $\Delta z$, where $\Delta z$ is the output signal of the z-piezo PI controller 114. As sample 110 moves in the x-y plane relatively to tip 108, features on the surface of sample 110 modulate the distance between the surface and tip 108. This signal enters the feedback loop as a disturbance signal $\delta z$, and represented in FIG. 2 by being added to $\Delta z$ at adder 234.

To maintain a constant frequency shift, the feedback loop compensates for the disturbance $\delta z$ by modulating $\Delta z$ accordingly, to generate the resulting topographic image of sample 108. Perfect tracking between tip 108 and sample 110 implies that $G_{\delta z}=1$, in which case $\Delta z^{piezo}$ contains the term $-\delta z$, cancelling out the disturbance signal $\delta z$. The transfer function $G_{\delta z}$ is therefore of particular importance, and may be used to optimize system 100. The poles and zeros of equation (12) may be determined, such as by applying numerical methods, to derive the parameter values that optimize the overall bandwidth and step response of system 100.

Since the frequency set point $\Delta f^{sp}$ is a constant DC signal, the term $\Delta f^{sp}G_{sp}$ contributes only a DC component to $\Delta z$, and it may be neglected in the analysis of AC contributions.

Reference is now made to FIGS. 3A-D, which illustrate exemplary experimental result for testing the validity of the formulation for the transfer function $G_{\delta z}$ of equation (12).

The validity of the transfer function $G_{\delta z}$ may be verified by adding a small modulation to the driving signal to piezo driver 116, and measuring the subsequent $\Delta z$ responsive to this modulation. Alternatively, the magnitude of $G_{\delta z}$ may be determined by measuring the power spectral density (PSD) of $\Delta z$. When the feedback loop is locked to a certain frequency set-point without scanning, $\delta z$ quantifies the system noise. The dominant contributions to the noise, within a typical feedback loop bandwidth, originates from mechanical vibrations, shot-noise of the photodiode in photo detector 122, and thermal noise of cantilever 108. The relation between $S_{\Delta z}$ and $S_{\delta z}$, the PSD of $\Delta z$ and $\delta z$ noise, respectively, may be given by $$S_{\Delta z}(\omega) = S_{\delta z}(\omega)\left|\frac{G_{\delta z}(i\omega)}{G_{piezo}(i\omega)}\right|. \quad (14)$$

Excluding occasional peaks which may occur at mechanical resonances of the system, $S_{\delta z}$ on average changes slowly as a function of frequency. The average rate of change of $S_{\delta z}$ is much smaller than that of $|G_{\delta z}(i\omega)/G_{piezo}(i\omega)|$, which is constant at low frequencies and decreases rapidly past its cutoff frequency. Consequentially, $S_{\Delta z}$ is practically proportional to $|G_{\delta z}(i\omega)/G_{piezo}(i\omega)|$.

Figure 3B:
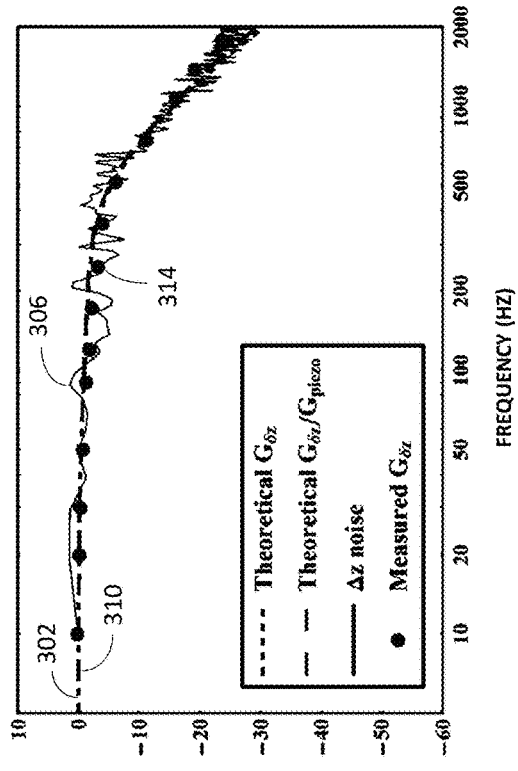
FIGS. 3A-D show experimental results validating the model of FIG. 2, in accordance with an embodiment.
Figure 3A:
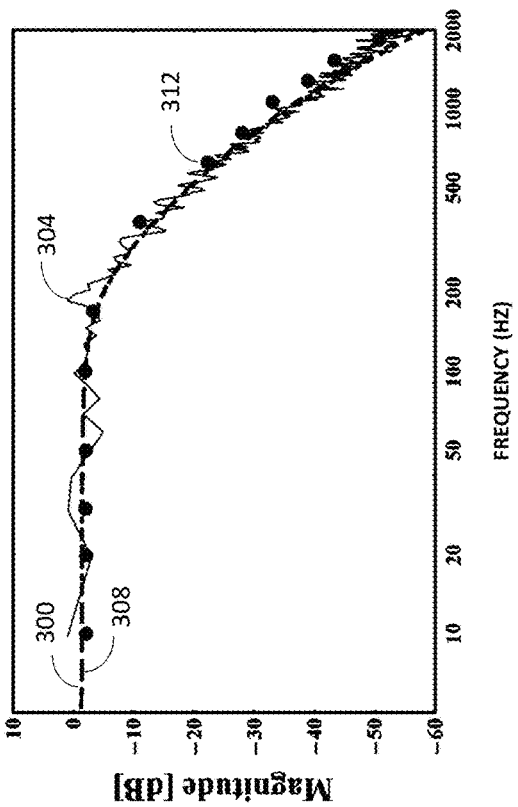
Figure 3D:
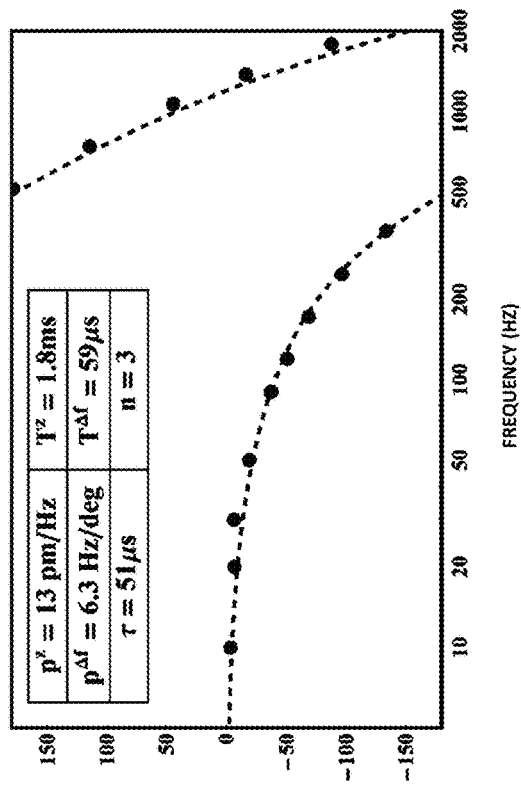
Figure 3C:
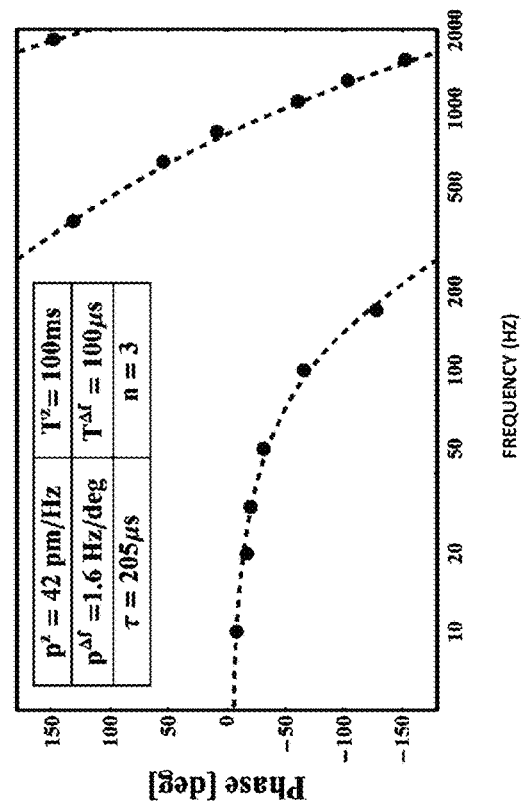

Referring to FIGS. 3A-D, equation (12) is validated experimentally for two sets of feedback parameters, defined in each of FIGS. 3C-D. FIGS. 3A-B illustrate magnitude plots and FIGS. 3C-D illustrate their corresponding phase plots, with FIG. 3C corresponding to FIG. 3A, and FIG. 3D corresponding to FIG. 3B. The theoretical curves of $G_{\delta z}$ in 300 and 302 and of $G_{\delta z}/G_{piezo}$ in 308 and 310 (dashed lines) were plotted using expression (12) for $G_{\delta z}$, modified by a 354 microseconds (μs) time delay added to $\delta z$ and a first order LPF with a 145 μs time constant added to the forward path of the feedback loop of FIG. 2. These modifications account for the transfer function and time delay of the digital PLL and controller (Specs Zurich, BP 4.5+OC4). Both measurements were performed on mica in a 100 mM NaCl solution. The $\Delta z$ noise PSD, shown as curves 304 and 306 (solid lines), was measured with the feedback loop locked on some set point frequency shift without scanning. $G_{\delta z}$ was measured by adding a small modulation to the piezo driving signal and measuring the response in $\Delta z$. The cantilever parameters in all plots were $f_0^{ref}=131$ kiloHertz (kHz), Q=8, and $f_o'(z_{ref})$ in the range of 100-200 Hz/nm. The feedback parameters used in each magnitude and phase plot pair are shown in the insets of FIGS. 3C-D.

As can clearly be seen in FIGS. 3A-D, the theoretical curves of $G_{\delta z}$ determined by the above model correspond in both magnitude (FIGS. 3A-B) and phase (FIGS. 3C-D) to the measured values of $G_{\delta z}$ (dots), indicated in FIGS. 3A-B as 312 and 314, respectively, thereby validating the theoretical model. Furthermore, the theoretical magnitude plots of $G_{\delta z}/G_{piezo}$ computed using the model above exhibit a strong correlation to the measured noise $\Delta z$. This property can be leveraged to determine the optimal parameters for tuning the feedback system, an implementation of which is described in greater detail below.

The transfer function $G_{\delta z}$, as formulated by equation (12), depends on six feedback parameters, which may be set by a user, such as one or more PI controller parameters and lock-in time constants, and three cantilever parameters, such as the quality factor Q and the cantilever reference resonance frequency $f_0^{ref}$ and the resonance frequency derivative $f_0'(z_{ref})$, that may be measured, as summarized in Table 1 as follows:

TABLE 1 parameters of $G_{\delta z}$

| Feedback parameters | Description | Cantilever parameters | Description |
|---|---|---|---|
| $\tau$ | low-pass filter time constant | $f_0^{ref}$ | cantilever reference resonance frequency |
| n | low-pass filter order | Q | cantilever quality factor |
| $p^z$, $p^{\Delta f}$ | proportional gains | $f_0'(z_{ref})$ | resonance frequency derivative |
| $T^z$, $T^{\Delta f}$ | time constants | | |

Given a set of cantilever parameters, the feedback parameters may be tuned to optimize the bandwidth and step response of $G_{\delta z}$, enabling the feedback loop, represented by loop 232 of FIG. 2, to track surface 110 with optimal accuracy and minimal noise.

The bandwidth $\omega_{bw}$ of feedback loop 232 may be defined by the 3 dB point of $|G_{\delta z}(i\omega)|$ and its optimal choice depends on the bandwidth of the signal $\delta z$. $\omega_{bw}$ may be bound within a range that is sufficiently large to allow imaging any features of interest on sample 110, but small enough to yield an acceptable noise level. Factors determining the bandwidth of $\delta z$ include sample topography and scanning speed.

In the context of FM-AFM system 100, the step response of $G_{\delta z}$ may take on the intuitive meaning of the image of a physical step. Thus, the closer the response of $G_{\delta z}$ is to the step input, the more accurate the image of sample 110 produced by the feedback loop represented by loop 232 in FIG. 2. An optimal step response has minimal rise time, minimal settling time, and minimal overshoot and ringing within the bandwidth constraint $\omega_{bw}$.

Using the outlined criteria for evaluating the feedback response, $G_{\delta z}$ may be analyzed numerically to find the optimal feedback parameters. The closed loop transfer function for $G_{\delta z}$ given by equation (12) can be expressed as a ratio of two polynomials. As such, its properties are dictated by its poles and zeros. Since the denominator is a polynomial of degree n+3, there are no simple analytic relations between the feedback parameters and the optimization criteria, namely $\omega_{bw}$ and the step response characteristics. Furthermore, the feedback parameters should be optimized with respect to the unknown tip-sample transfer function, $G_{ts}$, which generally varies during imaging.

To simplify this analysis, several of the parameters included in equation (12) may be determined as intrinsic properties of the experimental setup and may be predefined by a user, and/or measured in advance of scanning the sample, leaving fewer parameters to optimize. For example, the possible low pass filter characteristics, namely values for the low pass filter time constant $\tau$ and low pass filter order n may be predefined by the user.

An additional simplification is made possible by noticing that the interaction term, $f_o'(z_{ref})$, appears in $G_{\delta z}$ coupled with the proportional gain for the z-piezo loop $p^z$ as the combination $f_0'(z_{ref}) \cdot p^z$. This may be used to simplify the optimization problem significantly. Rather than optimizing $G_{\delta z}$ with respect to $p^z$ and a varying $f_o'(z_{ref})$ independently, $G_{\delta z}$ may therefore be optimized with respect to the combination of the terms, as they appear in the model above:

$$\tilde{p}^z = f_0'(z_{ref}) \cdot p^z \quad (15).$$

The poles and zeroes for $G_{\delta z}$ as expressed in equation (12) may be calculated numerically, and the corresponding bandwidth and step response values for feedback loop 232 may be analyzed to determine the optimal feedback parameters for frequency controller 112 and z-piezo controller 114. These calculated parameters may then be inputted into lock-in amplifier 130, frequency controller 112, and z-piezo controller 114 using an estimated training value for $\tilde{p}^z$.

Given the optimal values of $\tilde{p}^z$ derived above, and of the remaining feedback parameters: the proportional gain and time constant values for each of frequency controller 112, and z-piezo controller 114, $p^{\Delta f}$, $p^z$, $T^{\Delta f}$, and $T^z$, respectively, the corresponding magnitude Bode plot of $G_{\delta z}/G_{piezo}$ may be computed and compared to the $\Delta z$ noise PSD. Since as shown above in FIGS. 3A-B, the Bode plot and noise PSD plot are in strong agreement, and have the same form, by varying the parameter $p^z$, the $\Delta z$ noise spectrum may be fitted to the magnitude Bode plot. Once a good fit is found, such as shown in FIG. 3A, equation (15) may be approximately satisfied, thereby optimizing feedback loop 232. This same fit may also yield the unknown tip-sample transfer function $G_{ts}$, obviating the need to measure it independently. As the tip-sample transfer function varies during scanning, tuner 126 may apply the algorithm to adapt $p^z$ and optimize $G_{\delta z}$ in real time by continuous fitting the $\Delta z$ noise PSD.

Other techniques may be used to determine the feedback control parameters from the equations above, and separate the feedback parameter from the tip-sample interaction. For example, the parameter $p^z$ may be determined from $\tilde{p}^z$ by direct measurement of $f_0'(z_{ref})$.

In one non-limiting embodiment, tuner 126 may additionally tune amplitude feedback loop 102 by computing one or more control signals, such as the proportional gain and time constant parameters, for amplitude controller 128. Since feedback loop 102 is weakly coupled to loops 104 and 106, loop 102 may be tuned independently of the calculations described above using conventional tuning methods. Tuner may provide the computed parameters to amplitude controller 128, accordingly.

Figure 4:
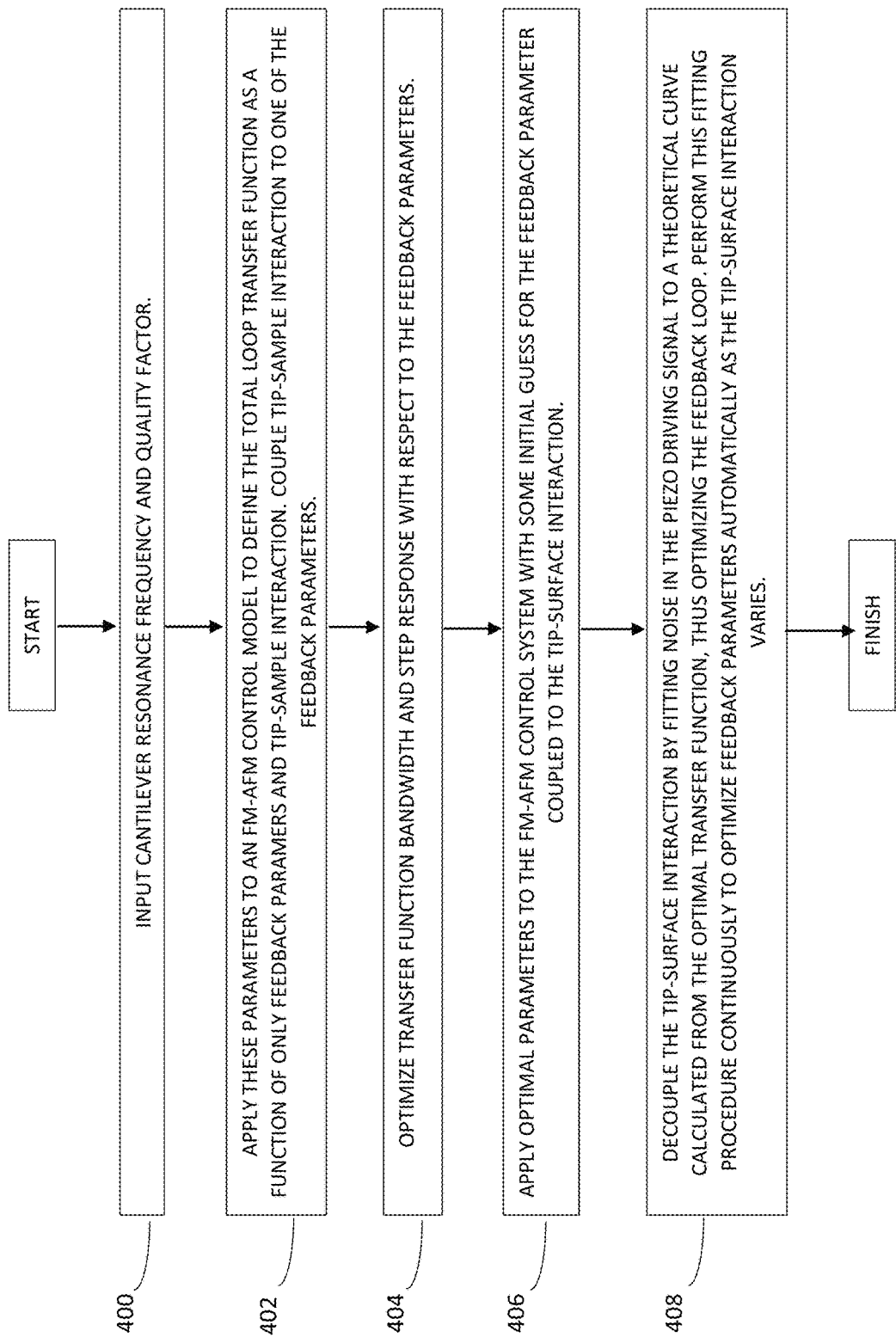
FIG. 4 shows a flowchart of a method for calibrating and tuning an FM-AFM system of FIGS. 1 and 2, in accordance with an embodiment.

Reference is now made to FIG. 4 which illustrates a flowchart of a method for tuning the FM-AFM system of FIGS. 1-2, in accordance with an embodiment. One or more input parameters associated with an FM-AFM system are received, such as an input resonance frequency and quality factor Q associated with a cantilever tip (Step 400). Additionally, a time constant $\tau$ and an order n of the low pass filter may be received. The input parameters are applied to an FM-AFM control model to define the total loop transfer function of the model as a function of the feedback parameters and tip-sample interaction (Step 402) such as may be a linearized model corresponding to equation (12) above. In one non-limiting embodiment, the total loop transfer function of the model is defined as a function of only the feedback parameters and tip-sample interaction. The transfer function bandwidth and step response of the total feedback loop are optimized with respect to the feedback parameters for the FM-AFM system (Step 404). The optimal parameters for the FM-AFM system are applied, together with an initializing estimated value for the feedback parameter coupled to the tip-sample interaction (Step 406). The tip-sample interaction is decoupled from the feedback parameter by fitting the noise from the piezo driving signal to a theoretical curve calculated from the optimal transfer function, thereby optimizing the total feedback loop (Step 408). This fitting step may be performed continuously to optimize the feedback parameters automatically as the tip-sample interaction varies during sampling. The FM-AFM system may be automatically tuned using the optimized feedback parameters throughout the sampling procedure.

Optionally, an amplitude gain and amplitude time constant may be calculated for an amplitude PI controller of the FM-AFM system, and may be used to tune the amplitude PI controller, accordingly.

Figure 5:
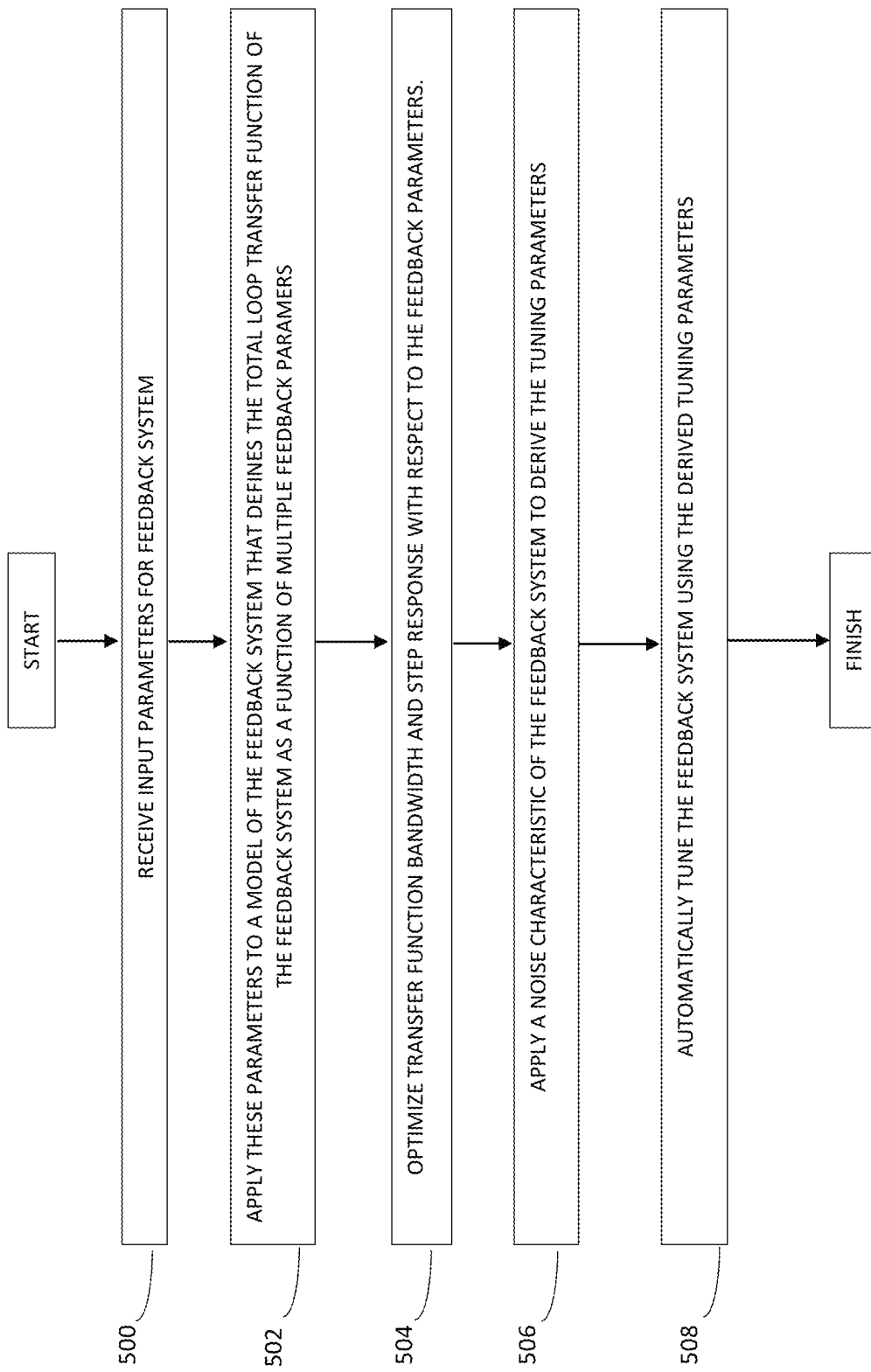
FIG. 5 shows a flowchart of a method for automatic tuning and calibration of a feedback system, in accordance with an embodiment.

Reference is made to FIG. 5 which illustrates a flowchart of a method for tuning a feedback system, in accordance with an embodiment. One or more input parameters associated with a feedback system are received (Step 500). The received parameters are applied to a model of the feedback system that defines the total loop transfer function of the feedback system as a function of multiple feedback parameters (Step 502). In some embodiment, the model is a linearized feedback model. The model is optimized with respect to the feedback parameters (Step 504). For example, the transfer function bandwidth and step response of the feedback system may be optimized. Additionally, an intrinsic property of the feedback system, such as a noise characteristic of the feedback system, is applied to the model to derive the optimal feedback parameters (Step 506). For example, a correlation between the noise characteristic to a characteristic of the model may be leveraged, and the noise of the feedback system may be adjusted by varying one of the feedback parameters, such as the proportional gain of a PI controller in the feedback system, until the noise fits a frequency response derived from the model of the feedback system. Thus derived, the parameters are used to automatically tune the feedback system (Step 508). In some embodiments, the feedback system comprises a frequency feedback loop coupled to a z-piezo feedback loop of a frequency modulated atomic force microscopy system, and the model includes two coupled feedback parameters comprising the proportional gain of the z-piezo PI controller coupled to the resonance frequency derivative, where the noise characteristic is applied to decouple the proportional gain of the z-piezo PI controller from the resonance frequency derivative.

The above described method may be performed repeatedly in real-time, to provide continual tuning of the feedback system throughout its operation.

Although the above system and method refers to applying the correlation between the feedback system noise and characteristics of the model to derive the control parameters, other characteristics of the feedback system, in addition to the noise, may be similarly applied.

The present invention may be a system, a method, and/or a computer program product. The computer program product may include a computer readable storage medium (or media) having computer readable program instructions thereon for causing a processor to carry out aspects of the present invention.

The computer readable storage medium can be a non-transitory, tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Experimental Results

Figure 6:
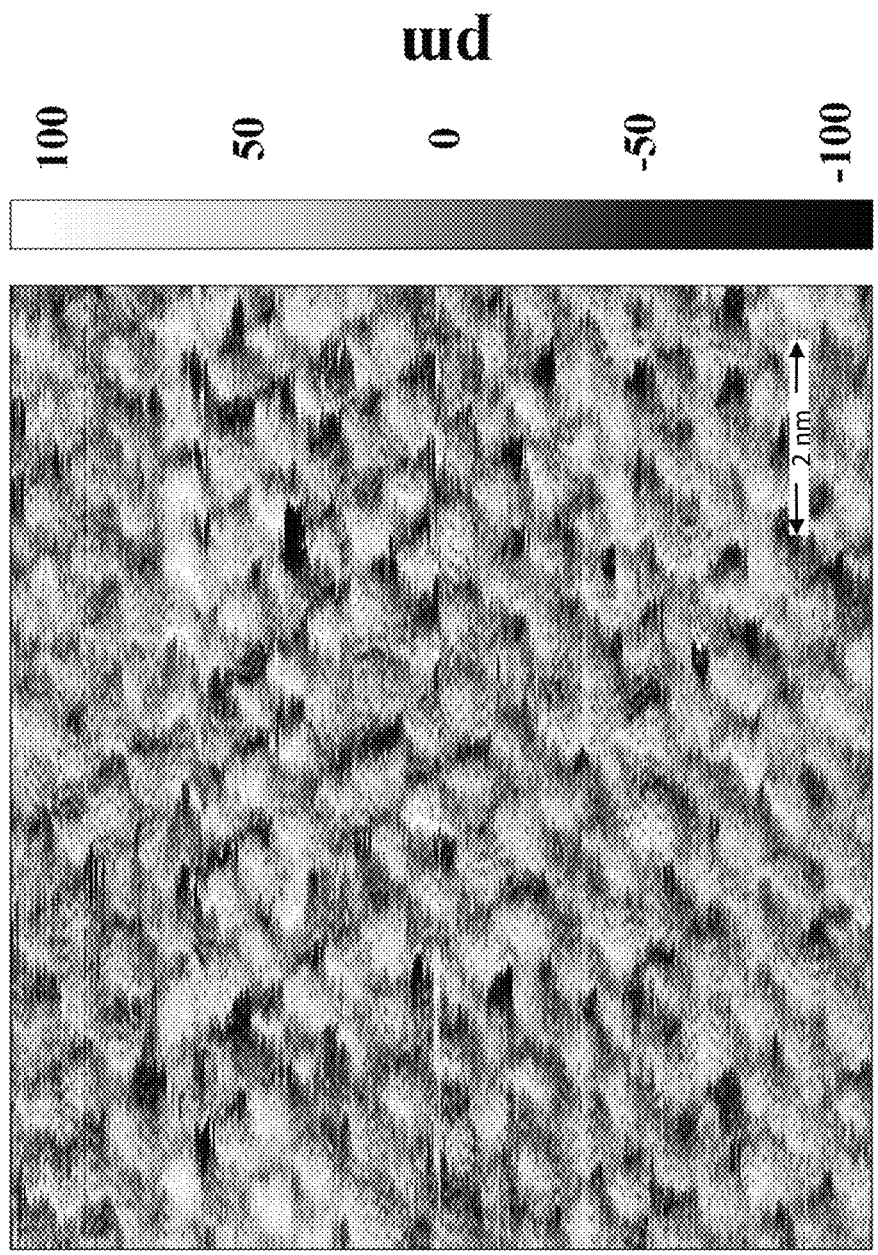
FIG. 6 illustrates experimental results of scanning Mica in aqueous NaCl solution imaged by an FM-AFM using the system and methods described herein.

The algorithm was implemented for optimization of the feedback loop parameters in Matlab, Fortran 90, and Labview. The feedback loop was customized for a home-made AFM and its Specs Zurich controller. The effectiveness of the above disclosed algorithm is demonstrated by an atomic resolution FM-AFM scan of mica in 100 millimolar (mM) aqueous NaCl solution, shown in FIG. 6. The scan was taken with the optimal feedback parameters derived by the algorithm, which were not tweaked in any way. FIG. 6 shows the plane-fitted raw data (scale bar shown corresponds to 2 nanometers).

Feedback parameters generated by this algorithm consistently delivered reliable feedback performance, even in applications that require a high degree of feedback optimization such as atomic resolution imaging in liquid. By using these parameters, stability was significantly increased and noise was reduced in the feedback loop. Additionally, there was a substantial improvement in the quality and reproducibility of images generated by this AFM.

What is claimed is:

1. A method for automatically calibrating a feedback system, the method comprising:
   receiving one or more input parameters associated with a feedback system, wherein the feedback system is a frequency modulated atomic force microscopy (FM-AFM) system comprising a cantilever tip configured to oscillate over a sample supported on a piezo stage, wherein the cantilever tip is controlled by a frequency feedback loop that is coupled to a z-piezo feedback loop that controls the piezo stage;
   applying the one or more input parameters to a model of the feedback system;
   deriving one or more feedback parameters for the feedback system from the model by:
      a) optimizing the model for the feedback parameters, and
      b) applying a noise characteristic of the feedback system to the model, including adjusting the noise characteristic to fit a characteristic of the model; and
   automatically tuning the feedback system using the one or more derived feedback parameters.

2. The method of claim 1, wherein the noise characteristic is adjusted by varying one of the feedback parameters, and wherein the characteristic of the model comprises a frequency response of the feedback system.

3. The method of claim 2, wherein the model of the feedback system includes two coupled feedback parameters, and wherein deriving the feedback parameters comprises decoupling the coupled feedback parameters by adjusting the noise characteristic to fit the characteristic of the model.

4. A computer program product comprising a non-transitory computer-readable storage medium having program code embodied thereon, the program code executable by at least one hardware processor to:
   receive one or more input parameters associated with a feedback system, wherein the feedback system is a frequency modulated atomic force microscopy (FM-AFM) system comprising a cantilever tip configured to oscillate over a sample supported on a piezo stage, wherein the cantilever tip is controlled by a frequency feedback loop that is coupled to a z-piezo feedback loop that controls the piezo stage;
   apply the one or more input parameters to a model of the feedback system;
   derive one or more feedback parameters for the feedback system from the model by:
      a) optimizing the model for the feedback parameters, and
      b) applying a noise characteristic of the feedback system to the model, including adjusting the noise characteristic to fit a characteristic of the model; and
   automatically tune the feedback system using the one or more derived feedback parameters.

5. The computer program product of claim 4, wherein the noise characteristic is adjusted by varying one of the feedback parameters, and wherein the characteristic of the model comprises a frequency response of the feedback system.

6. The computer program product of claim 5, wherein the model of the feedback system includes two coupled feedback parameters, and wherein deriving the feedback parameters comprises decoupling the coupled feedback parameters by adjusting the noise characteristic to fit the characteristic of the model.

7. A system for tuning a feedback system, comprising:
a feedback system; and
a tuner, wherein the tuner is configured to:
receive one or more input parameters associated with a feedback system, wherein the feedback system is a frequency modulated atomic force microscopy system (FM-AFM) comprising a cantilever tip configured to oscillate over a sample supported on a piezo stage, wherein the cantilever tip is controlled by a frequency feedback loop that is coupled to a z-piezo feedback loop that controls the piezo stage;
apply the one or more input parameters to a model of the feedback system;
derive one or more feedback parameters for the feedback system from the model by:
a) optimizing the model for the feedback parameters, and
b) applying a noise characteristic of the feedback system to the model, including adjusting the noise characteristic to fit a characteristic of the model; and
automatically tune the feedback system using the one or more derived feedback parameters.

8. The system of claim 7, wherein the noise characteristic is adjusted by varying one of the feedback parameters, and wherein the characteristic of the model comprises a frequency response of the feedback system.

9. The system of claim 8, wherein the model of the feedback system includes two coupled feedback parameters, and wherein deriving the feedback parameters comprises decoupling the coupled feedback parameters by adjusting the noise characteristic to fit the characteristic of the model.

\* \* \* \* \*